2,981,725
Patented Apr. 25, 1961

2,981,725

PROCESS FOR POLYMERIZING OLEFINS

Norbert W. Luft, Cheadle Hulme, and Dhafir Yusuf Waddan, Chorlton-cum-Hardy, Manchester, England, assignors to Shell Oil Company, a corporation of Delaware No Drawing. Filed Oct. 15, 1956, Ser. No. 615,750

Claims priority, application Great Britain Nov. 16, 1955

2 Claims. (Cl. 260—93.7)

This invention relates to novel methods for polymerizing alpha-olefins. More particularly, it relates to improved methods for polymerizing alpha-olefins in the presence of organo-metallic catalysts whereby improved yields are obtained.

It is now well known that when ethylene is contacted with various organo-metallic catalysts at low pressures, there results a mixture of dimers and some polymers of the ethylene. It has been additionally found that when certain promoters are added and used in conjunction with the catalyst, there results high molecular weight polymers of the ethylene. This discovery is considered to be an outstanding advance in the chemical arts because heretofore the preparation of polymers of ethylene has been accomplished by subjecting ethylene to very high pressures and very high temperatures for long periods of time. Furthermore, the discovery provides a method for the preparation of alpha-olefins other than ethylene. Since the above-described discovery, numerous important improvements have been found not only regarding the organo-metallic compounds that may be used, but also by the application of analogous techniques to other reactions. The nature of the catalysts which have been found to be similarly useful are described more fully hereinafter. They are generally referred to as "Ziegler-catalysts" and the body of reactions to which the technique has been applied is sometimes referred to as "Ziegler-reactions." Upon careful study of the economics involved in Ziegler reactions, it has been found that several serious problems arose which affected the cost of the products obtained from such reactions. One such problem is that the catalyst and the promoter participate in the reaction to such an extent that they are not recoverable for re-use. The result has been that the cost of products prepared using Ziegler reactions has been rather high because the catalysts are rather expensive. Another problem which arises in Ziegler reactions in general is that of removing the catalyst residues from the final products. One method for removing the residue is to wash the polymer several times in methanol thereby removing most of it. The removal of the residue is an important requirement since products containing the residue are usually less satisfactory than those which are substantially free of aluminum and titanium. In the absence of an inexpensive and simple means for separating the catalyst residues, together with the other factor mentioned above, it appears that the cost of products using Ziegler reactions may not represent an improvement in costs and in some cases the cost may be even higher.

It is an object of this invention to improve upon Ziegler reactions. It is another object of this invention to provide novel methods for polymerizing alpha-olefins whereby higher yields are obtained per unit of catalyst. It is yet another object of this invention for polymerizing alpha-olefins whereby higher yields per unit of catalyst are accomplished and at the same time reduce the quantity of catalyst residue from the product. It is still another object of this invention to improve upon Ziegler reactions whereby substantially lower processing costs are obtained. Other objects will become apparent as the decription proceeds.

These and other objects are accomplished in the method for polymerizing olefins comprising subjecting an olefin to the action of an organo-metallic catalyst and a promoter therefor, by the improvement which comprises conducting the polymerization in the presence of an inorganic inert carrier for said catalyst and promoter, and thereafter separating said carrier from said polymerization product. This invention is based on the finding that the processes involving Ziegler catalysts are primarily heterogeneous catalytic reactions and that the catalyst is essentially a solid precipitate formed by the interaction of the organo-metallic catalyst and the promoter. Accordingly, it is the surface layer of each catalyst particle which is effective in promoting the polymerization reaction. From this it follows that the amount of catalyst required to produce a given yield will be higher or lower depending on the surface area of the catalyst components which are accessible to the olefin reactant. By this invention, the surface area of the catalyst is very conveniently increased, or made more accessible to the reactants, e.g., the olefin or olefins to be polymerized, by supporting the catalyst components upon a carrier.

The carrier may be any inert inorganic solid. Such materials may be selected from a rather wide group of materials with certain preferences being expressed because of the numerous considerations involved in Ziegler reactions. Thus, for example, it will be understood that the carrier must be of the type which does not adversely affect the reaction. It is well known that Ziegler reactions are most desirably conducted under anhydrous conditions. Therefore, certain siliceous carriers may be undesirable since they sometimes contain some hydroscopic moisture. However, such carriers are perfectly satisfactory after they have been subjected to drying before being used in the methods of this invention. Under other circumstances, if an otherwise attractive carrier is capable of adversely affecting the reaction, e.g., by water-absorbing, it may first be coated with some inactive material, as a resin or polymeric material of the type that is produced by the process in question.

In general, catalyst carriers for the purposes of this invention may be selected from two large groups of solid inorganic substances. These include water-soluble inorganic salts and mineral substances such as water-insoluble clays, earths, and the like. When the reaction is complete, the carrier is removed by either washing out the water-soluble salt or by dissolving the polymer in a suitable solvent and separating the insoluble mineral. In this way, the carrier is completely separated and other difficulties associated with removal of catalyst residues from the polymer are considerably reduced as there is a tendency for some of the catalyst residue to be separated during the washing and filtering processes for the separation of the carrier. The water-soluble inorganic salts which are suitable in the methods of this invention include any inert solid, water-soluble salt but it is especially preferred that those derived from a strong acid or a strong base be used. The reason for this is that such salts are more easily separated. Typical water-soluble salts which are suitable include such as sodium carbonate, magnesium chloride, potassium carbonate, sodium chloride, calcium chloride, sodium sulfate, and the like. As in the case of siliceous materials which contain moisture, salts having water of hydration are satisfactory after they have been completely dried. Other inorganic material which may be similarly utilized includes such materials as silica gel, activated alumina, kieselguhr, activated carbon, activated montmorillonite clay, activated kaolinite clay, and the like. The last group of materials is particularly suitable as they are easily recovered from the processes of this invention and are capable of re-use. The water-soluble salts described above are likewise capable of re-use but because of their low cost it is generally too costly to recover them.

The quantity of the carrier which is used may be varied over a rather large range depending upon such factors as particle size, the quantity of the catalyst and the promoter, the surface area of the carrier, and similar considerations but in general, it is found that amounts ranging from 0.5 to 3 parts by weight of the carrier for each .005 to 1 mole of the catalyst is adequate. The quantity of the promoter is not critical and may range from about .5 to about 3 moles of the catalyst. More often, however, the ratio is in the order of 1:1 to 1:2. Regarding the particle size of the carrier, it appears that particles in the order of 0.1 to 50 microns are suitable with an average particle size from about 1 to 15 microns being preferred. It will readily be understood that the particle size and the ratio of catalyst to carrier are not critical considerations as the methods of this invention are more dependent upon the available surface area of the catalyst particles. Therefore, the same results may be accomplished by the use of larger particle sizes and still higher ratio of catalyst components to carrier. Where activated materials are used, the particle size and the quantity needed may be considerably lower.

As previously indicated, the polymerization of olefins using the catalyst and promoter require that the catalyst and the promoter be present together. In the usual mode of operations the catalyst and the promoter are mixed together whereupon a dark precipitate forms. This precipitate is the ultimate catalyst which apparently is a complex of the catalyst and the promoter. As applied to methods of this invention, the same complex is formed but it is so prepared as to be formed on the surface of the carrier. This is accomplished by dispersing the carrier in a non-reacted organic solvent such as pentane, hexane, isooctane, and the like. With rapid stirring, the catalyst or the promoter is added to the suspension and the agitation is continued for a while to permit the catalyst, or the promoter, to become interdispersed on the carrier. Thereafter, the other component, either the catalyst or the promoter as the case may be, is added. Agitation is continued for a short period to permit it to likewise become interdispersed and form the complex on the carrier. At this point, the complex supported on the carrier is ready for use in the polymerization reaction. It will be observed that the diluent used to disperse the carrier is a solvent for the catalyst and the promoter and is inert to the carrier itself, but the complex formed from the catalyst and promoter is insoluble in the same diluent.

After the polymerization is complete, it is desirable, but not necessary, to separate the diluent before effecting the separation of the catalyst. If the carrier is a water-soluble salt, the polymer is slurried in water until all the salt is dissolved and the polymer is separated. If the carrier is a mineral substance as diatomaceous earth, then the polymer is dissolved in a solvent, as diethyl ether, and the carrier is separated. If desired, the solvents may be heated to hasten the separation although it is not necessary. In separating the carrier from the polymer centrifuging is used to advantage when the carrier is a water-soluble salt. On the other hand, when the polymer is put in solution, filtration is preferred.

The catalyst component of the composition may be selected from a variety of compounds. The preferred compounds are aluminum alkyls of the formula $Al(R)_3$ where the R's are straight chain lower alkyl radicals of 1 to 10 carbon atoms. Among the preferred aluminum alkyls are aluminum trimethyl, aluminum triethyl, aluminum tributyl, and the like. The preference for these catalysts is governed by their availability but the invention is not limited to these specific types for it is well known that Ziegler catalysts include those of the formula $R_1R_2AlX$ where $R_1$ and $R_2$ are similar or dissimilar and are selected from hydrogen or a hydrocarbon radical and X represents hydrogen, halogen, alkoxy or aryloxy groups, the residue of a secondary amine, secondary acid amide, mercaptan, thiophenol, carboxylic acid or sulfonic acid. In the case of the preferred catalysts, that is, the aluminum trialkyls, extreme caution should be exercised in handling them as they ignite quickly when exposed to air, oxygen, carbon dioxide and compounds that have active hydrogen atoms such as allyl chloride.

The promoter may be selected from a large group of metals within the "a" subgroup of Groups IV to VI of the Periodic Table which includes titanium, palladium, zirconium, vanadium, chromium, molybdenum, tungsten, and the like. Desirably, salts of some of the compounds may be used with particular advantage such as the chlorides, oxychlorides, and acetonates of titanium and zirconium. Particularly preferred are the chlorides of palladium, zirconium and titanium with the last being most preferred.

The methods of this invention are fully operable irrespective of the various techniques heretofore described for the polymerization of alpha-olefins. This is so, irrespective of temperatures, pressures and mode of reaction. Additionally, the catalyst compositions are equally suitable for such processes as continuous, intermittent and batch operations. The invention is more fully described in the following examples which are intended for purposes of illustration only.

*Example I*

To a reaction vessel equipped with heating and cooling means, and agitator, and suitable inlets and outlets, are added 300 ml. of isooctane and 1 g. of silicon carbide which is thoroughly dried. The silicon carbide, which has a particle size ranging from 1 to 10 microns, is slurried in the diluent while ethylene is slowly passed through the reaction vessel to exclude the air. With rapid agitation, 0.5 mole of titanium tetrachloride is added at 40° C. The mixture within the reaction vessel is maintained at this temperature with constant agitation for several minutes. Thereafter, 0.65 mole of aluminum diethyl chloride is added. The mixture is agitated continuously for several more minutes in order to give the titanium tetrachloride and the aluminum diethyl chloride an opportunity to form in a complex. After about 20 minutes, the flow rate of the ethylene is increased to give a fast rate of polymerization. At the end of about 5 hours, the thick polymer slurry is diluted with methanol and the mixture is agitated and then filtered. The polymer is then dissolved at elevated temperatures in n-heptane and the mass is then subjected to filtration whereupon the silicon carbide carrier is separated. On cooling, about 60 grams of a polymer having an intrinsic viscosity of 1.6 in 0.1% trichloroethylene is precipitated out of the solution. This compares with about 35 grams of polymer from a comparative test without a carrier.

*Example II*

The procedure of Example I is repeated except that silica gel replaces the silicon carbide as the carrier and aluminum triethyl replaces the aluminum diethyl chloride. Substantially the same results are obtained.

*Example III*

The procedure of Example I is repeated using activated monmorillonite and zirconium tetrachloride as the promoter.

*Example IV*

The procedure of Example I is repeated using magnesium chloride as the carrier. When the polymerization is complete, a small quantity of methanol is added to thin-out the slurry and to destroy unreacted catalyst.

Thereafter, the mass is filtered and the polymer is then washed a few times with water to remove the magnesium chloride.

Similar experiments are conducted using other carriers as sodium carbonate, calcium chloride, sodium sulfate, activated carbon and kieselguhr. It will be found that the process is equally satisfactory when the catalysts and the promoters are varied. Other catalysts include aluminum trimethyl, aluminum diethyl bromide, aluminum tripropyl, and the like. Other promoters are selected from water-free zirconium tetrachloride and titanium acetonate. In each instance, it is found that the yield of the polymer is substantially higher than in comparative tests in which the catalyst composition does not include a carrier.

The processes of this invention are equally suited for polymerizing other alpha-olefins by the Ziegler process. Thus, for example, as applied to propylene, the procedure of Example I is repeated except that the quantities of the olefin, the catalyst and the promoter are adjusted. The solvent is advantageously a mixture of heptane and isooctane. In this case, as in the other example, it makes no difference whether the carrier is a water-soluble salt or a mineral substance. It will be found in the case of propylene, as in the case of ethylene, that the yields of polymer are similarly increased per unit of catalyst and promoter. Other alpha-olefins may be similarly polymerized by the methods of this invention such as butene, hexene, octene, and the like.

It will be understood that the processes of this invention are fully operable irrespective of the numerous intermediate operations that sometime occur in Ziegler reactions. Thus, for example, it is common practice to treat the reaction mixture prior to separation and purification with a lower alcohol as methanol in order to destroy any unreacted catalyst. Another common expedient in reactions of this type is to add the catalyst and/or the promoter at various points as the reaction proceeds in order to obtain higher yields or to obtain some other processing advantage. Another common technique in Ziegler reactions is to vary the temperature and pressures in order to obtain products that have various configurations and properties. More recently, it has been found that if Ziegler reactions are conducted in continuous processes the yields are substantially improved per unit of catalyst. The methods of this invention are equally effective for continuous processes and the result is that still higher yields are obtained. In all cases, it is found that such intermediate steps have no effect on the essential nature of this invention.

We claim as our invention:

1. In the method for polymerizing a mono-alpha olefin of two to three carbon atoms at temperatures below about 120° C. and pressures below 500 p.s.i.g., the said polymerization being conducted in the presence of an inert hydrocarbon solvent and in contact with a catalyst which consists essentially of the product of aluminum diethyl chloride and titanium tetrachloride, the improvement comprising mixing the said catalyst with magnesium chloride in an amount ranging from 0.5 to 3 parts by weight per 0.005 to 1 mole of the said aluminum compound.

2. In the method for polymerizing a mono-alpha olefin of two to three carbon atoms at temperatures ranging below about 120° C. and pressures below 500 p.s.i.g., the said polymerization being conducted in the presence of an inert hydrocarbon solvent and in contact with a catalyst that consists essentially of the product of aluminum diethyl chloride and titanium tetrachloride, the improvement comprising mixing the said catalyst with a salt selected from the group consisting of sodium carbonate, potassium carbonate, calcium chloride, sodium chloride, sodium sulfate, and magnesium chloride, the said salt being used in an amount ranging from 0.5 to 3 parts by wieght per 0.005 to 1 mole of the said aluminum compound.

References Cited in the file of this patent

UNITED STATES PATENTS

| | | |
|---|---|---|
| 2,666,756 | Boyd | Jan. 19, 1954 |
| 2,781,410 | Ziegler et al. | Feb. 12, 1957 |
| 2,791,576 | Field | May 7, 1957 |
| 2,824,089 | Peters | Feb. 18, 1958 |
| 2,827,447 | Nowlin et al. | Mar. 18, 1958 |
| 2,840,551 | Field et al. | June 24, 1958 |
| 2,843,577 | Friedlander et al. | July 15, 1958 |
| 2,862,917 | Anderson et al. | Dec. 2, 1958 |
| 2,886,561 | Reynolds et al. | May 12, 1959 |
| 2,905,645 | Anderson et al. | Sept. 22, 1959 |
| 2,909,512 | Bruce | Oct. 20, 1959 |

FOREIGN PATENTS

| | | |
|---|---|---|
| 533,362 | Belgium | May 16, 1955 |

OTHER REFERENCES

Emmett: "Catalysts," vol. 1 (1954) pp. 245, 246, 249–251 and 260, pub. by Reinhold Pub. Corp. (New York).